A. NIGGLI.
SCREW CUTTING MACHINE.
APPLICATION FILED AUG. 15, 1913.
1,132,026.
Patented Mar. 16, 1915.
3 SHEETS—SHEET 3.
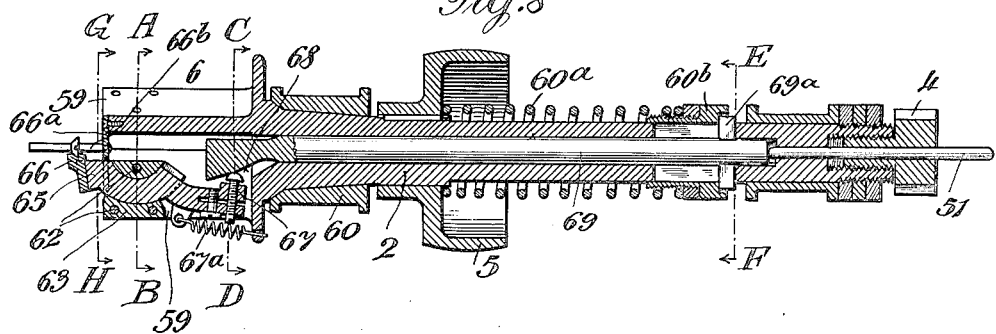
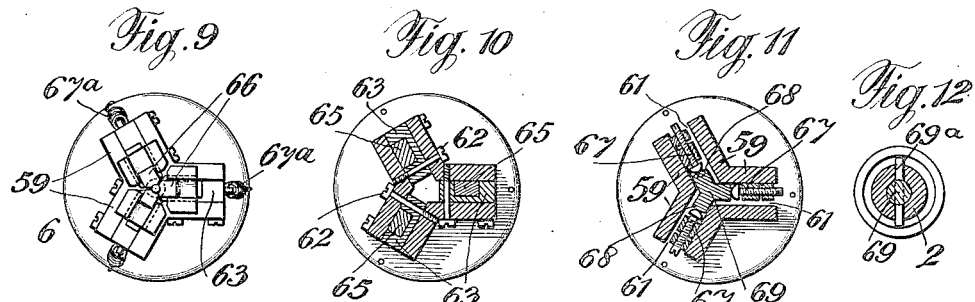
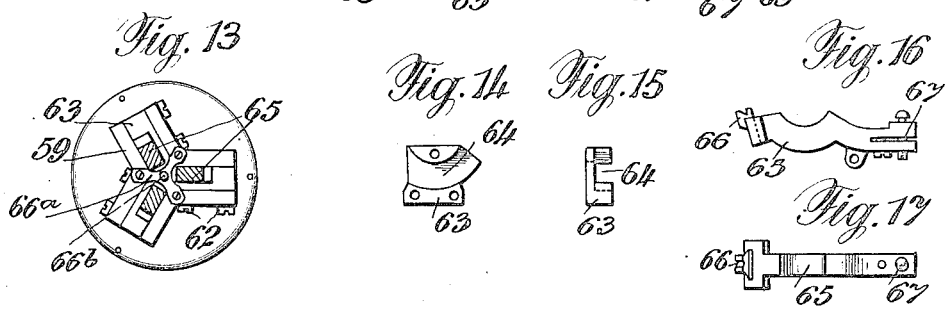
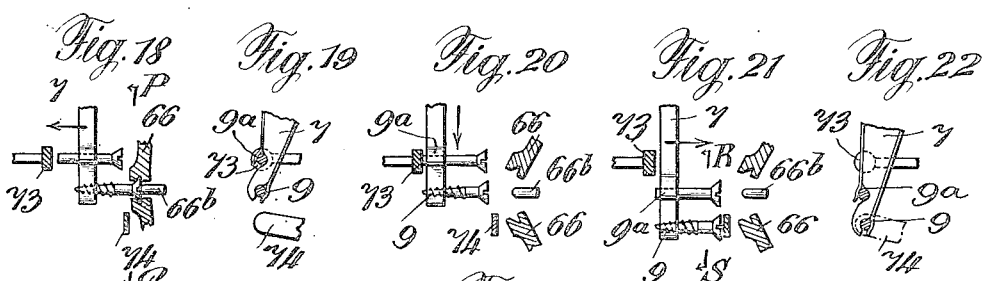
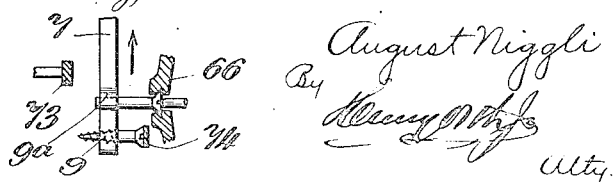
Witnesses:
R. V. Dommers
E. Leckert
Inventor:
August Niggli
By Henry N——
Atty.

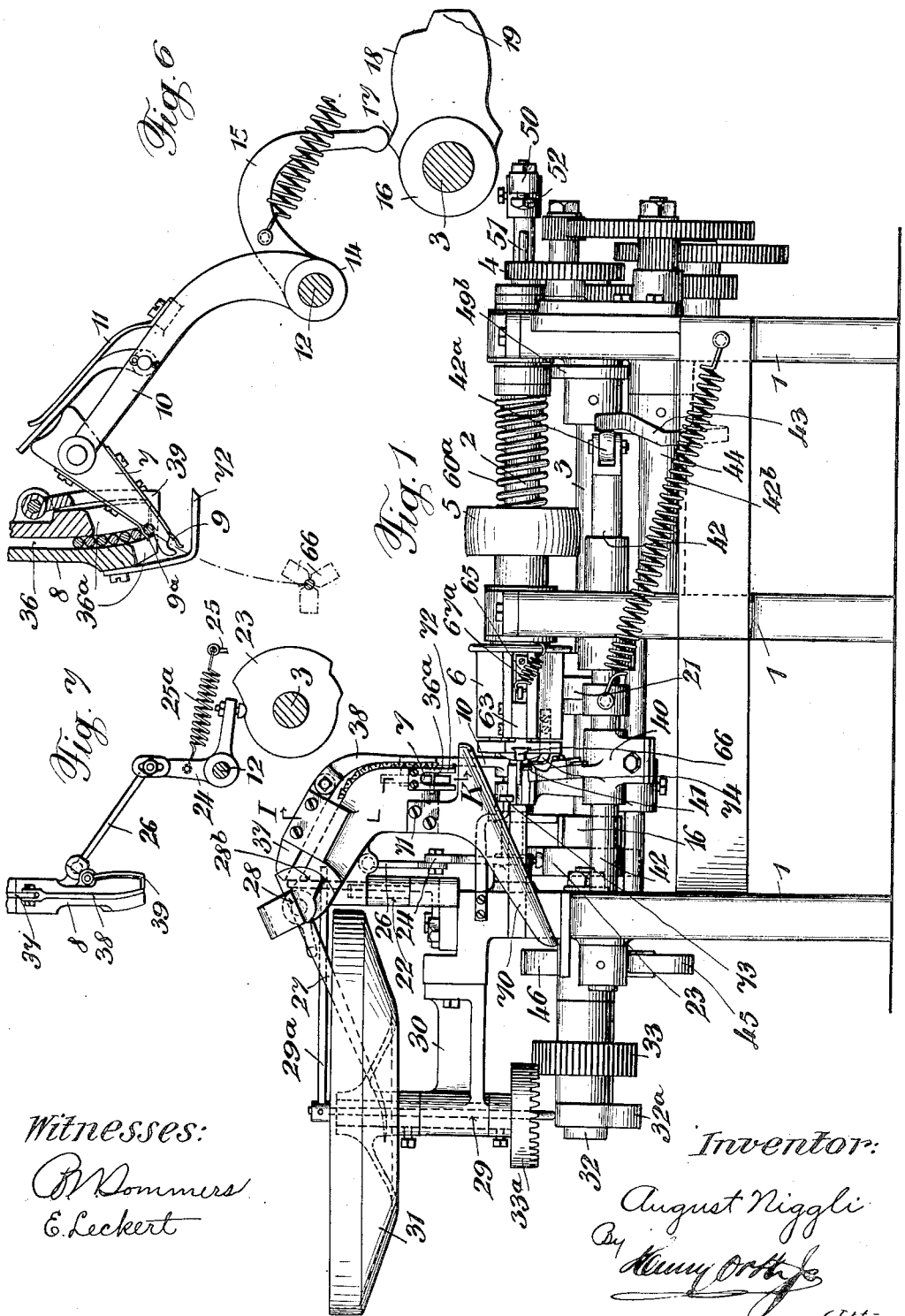

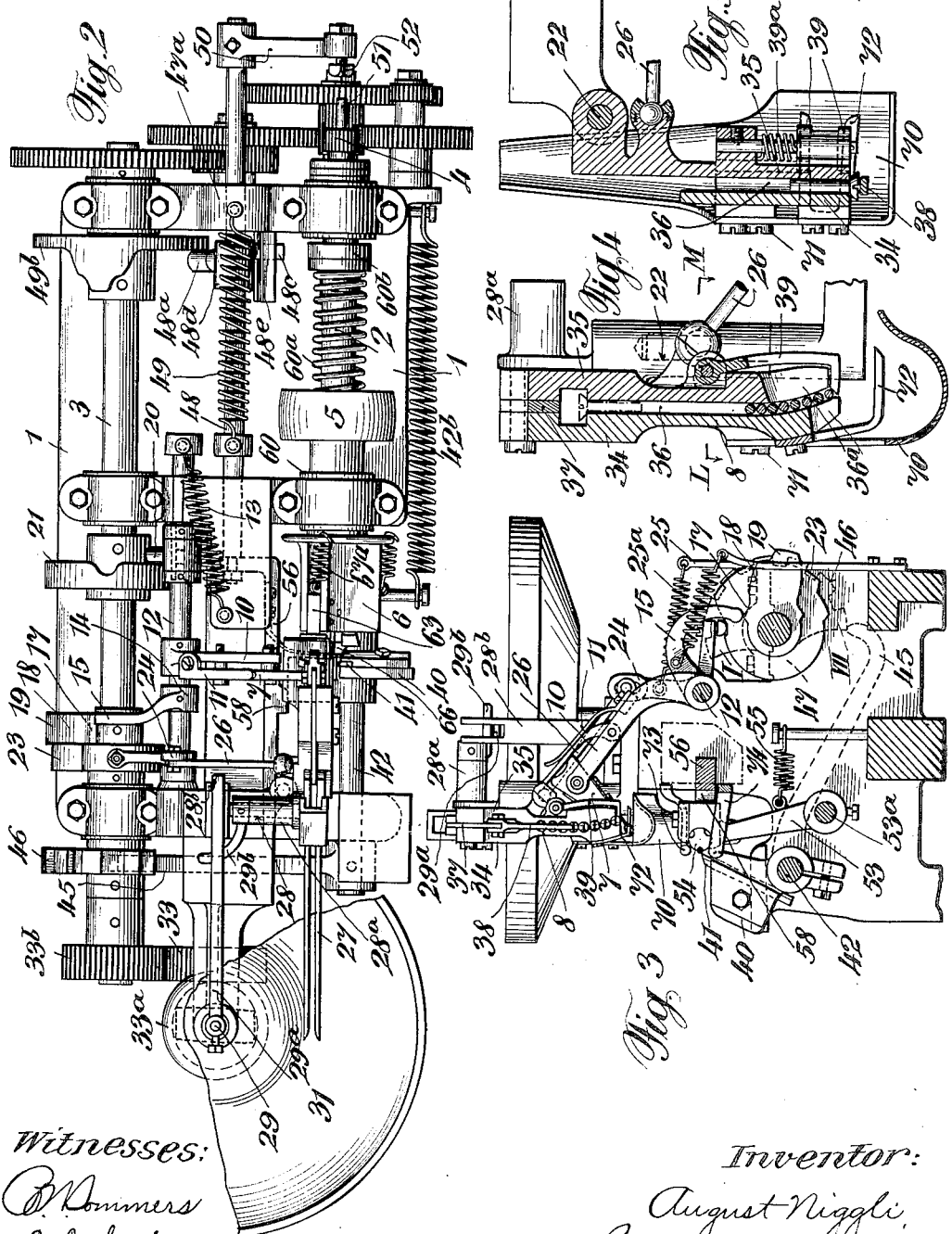

UNITED STATES PATENT OFFICE.

AUGUST NIGGLI, OF RHEINECK, SWITZERLAND, ASSIGNOR TO THE FIRM OF HENRI LEVY, OF RORSCHACH, SWITZERLAND.

SCREW-CUTTING MACHINE.

1,132,026.  Specification of Letters Patent.  Patented Mar. 16, 1915.

Application filed August 15, 1913. Serial No. 784,920.

*To all whom it may concern:*

Be it known that I, August Niggli, a citizen of the Republic of Switzerland, residing at Rheineck, Switzerland, have invented certain new and useful Improvements in Screw-Cutting Machines; and I do hereby declare the following to be a full, clear, and exact description of the invention, such as will enable others skilled in the art to which it appertains to make and use the same, reference being had to the accompanying drawings and to letters or figures marked thereon, which form a part of this specification.

This invention relates to improvements in screw cutting machines and particularly to a machine for producing screws provided with heads, said machine having a feed mechanism provided with a clamping arm carrying the work pieces separately from a feed channel to a pivotally mounted gripping head consisting of several gripping jaws, which securely hold the work piece in the proper position while the thread is cut therein, the machine being further provided with a collecting trough into which the work pieces are conveyed by said clamping arm after the cutting of the thread.

The object of this invention is to eliminate certain existing drawbacks. To effect this there are provided in the gripping head for the work pieces gripping levers, which carry gripping jaws and which are arranged in such a manner in said head, that they can revolve around a point of the central axis of the head, the jaws being moved at the same time partly in and out of said gripping jaws, so that short work pieces can easily be removed from the head. Further, the feed device of the machine according to this invention is actuated by means of an eccentric disk provided with a number of cams successively increasing in height which accelerate the feed operation.

A further feature of this invention consists in that the feed channel, which is inclined and which is provided at its lower end with a downwardly directed deflection, is made to pivot on a vertical axis together with a collecting trough for the finished work pieces and the stripper connected to said channel. To prevent a stopping of the work piece in the feed channel and in order to effect a proper downward movement of the separate work pieces in the latter, the lower part of the channel is bent sideward, viz. toward the feed mechanism.

A convenient mode of carrying this invention into effect is shown by way of example on the accompanying drawings in which—

Figure 1 shows a front view of a screw-cutting machine according to this invention, Fig. 2 is a plan view of Fig. 1, Fig. 3 is a section on the line N—O of Fig. 1, Fig. 4 is an enlarged section on the line I—K of Fig. 1, Fig. 5 is a horizontal section on the line L—M of Fig. 4, Fig. 6 shows an enlarged view, partly in section of the feed mechanism, Fig. 7 shows the mechanism for moving the feed channel, Fig. 8 shows a section of the gripping head and of the mechanism for actuating its gripping jaws, Fig. 9 is a side view of Fig. 8 seen from the left hand-side, Figs. 10, 11 12 and 13 are sections on the lines A—B, C—D, E—F and G—H respectively of Fig. 8, Figs. 14 and 15 show two views of the guide piece for the gripping jaws, Figs. 16 and 17 show a front and a plan view of a gripping jaw and Figs. 18 to 23 show diagrammatically how the gripping arm brings the work pieces in and out of engagement with the gripping head, Fig. 19 being a section on the line P—Q of Fig. 18 and Fig. 22 a section on the line R—S of Fig. 21.

The illustrated machine consists substantially of a feed mechanism, a mechanism for cutting the screw thread and a device for collecting the finished screws. The two mechanisms are actuated by a horizontal driving shaft 2 (Figs. 1, 2) arranged in the machine frame 1. The drive is transmitted by means of toothed wheels shown on the right hand side of Figs. 1 and 2 from the shaft 2 to a shaft 3 and a shaft 42 parallel to the shaft 2, the shaft 2 being provided with a pinion 4 and a pulley 5 (Fig. 2). This shaft 2 is hollow and it carries at its inner end a gripping head 6 (Figs. 1 and 8).

I shall now describe separately the above mentioned mechanisms and the device for collecting the finished screws.

*1. The feed mechanism* (Figs. 1 to 7).— This consists mainly of an oscillating carrier arm 7 and a feed channel 8. The arm 7 carries at its lower end two clamping members 9 and 9ª for the work pieces and it is pivotally connected to an arm 10. Spring 11 retains the arm 7 in a fixed relative position as regards the arm 10. The arm 10 is mounted unto a shaft 12, parallel to the driving shaft 2 and is capable of being shifted in its longitudinal direction. The shaft 12 is acted upon by a spring 13 attached at one end to the frame 1. (Fig. 1). To a sleeve 14 mounted on the shaft 12 (Figs. 2-3) is connected an arm 15 acted upon by a spring, which presses the lower end of this arm against a cam disk 16 mounted on the shaft 3. The cam disk 16 is provided with three cams 17, 18, 19 successively increasing in height. (Fig. 3). The shaft 12 is provided with a laterally projecting pin or roller 20, which bears against an end surface of a cam disk 21 mounted on the shaft 3 (Fig. 2). The cam disk 16 imparts to the arm 7 by means of the arms 15 and 10 an oscillating movement, while a lateral movement is imparted to said arm 7 by the cam disk 21 and the roller 20. The three cams 17, 18, 19 successively increasing in height accelerate the movement of the arms 15, 10 and 7 the latter being provided with the two clamping members 9 and $9^a$. The speed of the feed mechanism of this machine is therefore increased as regards the known screw cutting machines and the taking out of the finished work piece from the gripping head 6 is effected in much less time. The feed channel 8 (Figs. 4 to 7) is capable of being rotated in such a manner on a vertical axis 22 (Fig. 5) that it may be moved toward or from the gripping arm 7. To effect a turning of this channel 8 a cam disk 23 is provided on the shaft 3 and a bell crank lever 24, is loosely mounted on the shaft 12 and is acted upon by a spring $25^a$ (Figs. 3 and 7) connected at one end to a rod 25 (Fig. 3) fixed to the machine frame. The lever 24 is connected to a rod 26, the one end of which is pivotally connected to the feed channel 8. The work pieces $x$ are conveyed into the channel 8 by means of a feed arm 27 fixed on a pin 28, which is journaled in a bearing sleeve $28^a$ (Figs. 2 and 3) on the channel 8. This arm 27 is lifted by means of a vertically movable rod 29 (Fig. 1) which is connected at its upper end to a horizontal rod $29^a$, which projects under and bears against a curved lever $29^b$, (Fig. 2) also rigidly connected to the pin 28 and guided in the fork-shaped end of a support $28^b$. The rod 29 has its bearing in the cylindrical part of a bracket 30 carrying a dish-shaped receptacle 31 for the bolts to be fed into the channel 8. To actuate said rod 29 there is provided a cam disk $32^a$, carried by a shaft 32 having its bearing in the frame 1. The shaft 32 carries also a toothed wheel 33 engaging a toothed wheel $33^b$ mounted on the shaft 3 and the toothed wheel $33^a$ imparting a turning movement to the receptacle 31. The feed channel 8, which is shown on an enlarged scale in Figs. 4 and 5 consists of two adjacent guide rails 34 and 35 confining a space 36. The upper part of the two rails 34 and 35 is inclined (Fig. 1) and they are provided with an inwardly bent lower end, so that the lower part of said space 36 is not vertical, but, as shown on Fig. 4, deflected toward the feed mechanism. In the lower end of this feed channel there is provided a slot $36^a$. (Figs. 4 and 6). Above the channel 8 is mounted a fixed guide piece 37 (Fig. 1) provided with a movable lower end 38. To the channel is further pivotally mounted a holder 39 (Fig. 4), which normally prevents the work pieces $x$ from falling out of the space 36. This holder 39 is acted upon by a spring $39^a$ (Fig. 5), so that it is held normally in the position shown in Fig. 4.

*2. The mechanism for cutting the screw-thread.*—40 denotes the holder of the cutting tool 41. This holder 40 is mounted on a shaft 42, supported in the frame 1 of the machine. The shaft 42 carrying the holder 40 is moved in its longitudinal direction by means of a cam disk 43 fixed on the aforementioned shaft 44 (Fig. 1). On the shaft 42 is also mounted a lever 45 shown in Fig. 3 in dotted lines, said lever being acted upon by a spring not shown, so that its free end is pressed against a cam disk 46 (shown in Fig. 3 in dotted lines and in Fig. 2 in full lines). This disk 46 is provided on its surface with alternately succeeding projections and recesses (Fig. 3). The radius of these projections increases gradually from I to VII (Fig. 3) and there is provided a recess 47 between I and VII, which nearly extends over one half of the circumference of the disk 46. The shaft 42 has at its right hand end a roll $42^a$, which is pressed by a spring $42^b$ against the cam disk 43. The cam disk 43 imparts to the cutting tool holder 40 a to and fro movement in the longitudinal direction of the work piece $x$ gripped by the jaws of the gripping head 6, while said cutting tool is also moved alternately toward and away from the work piece $x$, by the lever 45, actuated by the projections and recesses of the disk 46. After each penetration of the tool into the work piece $x$ and after the taking off of a cutting the tool is moved away from the work piece $x$ and is brought back into its normal position opposite the pointed end of the work piece, while it penetrates then deeper into the work piece during its forward movement owing to the greater height of the next cam or projection of the cam disk 46. In the present instance the thread is completed after the tool has been caused to penetrate seven times into the work piece.

In bearings $47^a$ of the machine frame 1 is mounted in a rod 48 (Fig. 2) which is slidable in its longitudinal direction and which is acted upon by a spring 49. The rod 48 carries an arm 50, the free end of which is normally opposite a rod 51 (Figs. 2, 8) arranged in the right hand end of the driving shaft 2. The free end of the arm 50 is provided with a screw 52, which permits an adjustment of said arm as regards the rod 51. The rod 48 carries a roll 48ª, (Fig. 2), which is pressed by said spring 49 against a cam disk 49ᵇ mounted on the shaft 3. This disk 49ᵇ causes a longitudinal displacement of the rod 48. A pin 48ᶜ provided on the hub 48ᵈ of the arm carrying the roll 48ª and engaging a stationary guide 48ᵉ fixed to the machine frame 1 prevents the rod 48 from turning, so that the screw 52 is always kept in the proper relative position as regards the rod 51.

53 denotes a support, which can be shifted in and out of its engaging position. This part 53 (Fig. 3) serves to support the work piece x when the latter is engaged by the jaws of the gripping head 6 and is acted upon by the cutting tool. The support 53 is pivotally mounted on a shaft 53ª, supported in the frame 1 and it carries a removable piece 54, which, when the support 53 is in its operative position, presses with a notch against the work piece x which is shown in Fig. 3 as a black disk. The support 53 is acted upon by a tension spring 55, which presses said support against a horizontally movable rail 56 removably connected to the rod 48 and provided with an inclined surface 58. This rail 56 is guided in the frame.

As already mentioned, the gripping head 6 is carried by the shaft 2. The gripping head 6 consists of three gripping jaws 59 (Figs. 8–17). For the sake of clearness there is shown only one of these jaws in Fig. 8. The driving shaft 2 is capable of being rotated in bushings 60 and it is surrounded by a spring 60ª arranged between the pulley 5 and a collar 60ᵇ. The front end of the shaft 2 is provided with three slots 61 (Fig. 11). In each of these slots is fixed by means of bolts 62 a guide piece 63 (Figs. 14, 15) provided with an arc-shaped guide groove 64. In this guide groove 64 is slidably mounted a similar shaped gripping lever 65 (Figs. 8, 16, 17) provided with a clamping jaw 66. This clamping jaw is capable of rotating around the center of the guide groove 64 which center is situated in the axis of rotation of the gripping head 6. The rear end of each gripping lever 65 projects into the corresponding slot 61 of the shaft 2 and is provided with an adjusting screw 67, (Figs. 8, 11) the round head of which is pressed by means of a spring 67ª against an inclined surface 68 of a slidable rod 69, which is acted upon by the aforementioned rod 51 as well as by the spring 60ª, since the collar 60ᵇ presses against a pin 69ª passing through this rod 69 (Figs. 8, 12). To the front end of the gripping head is fixed a plate 66ª (Figs. 8, 13) carrying a pin 66ᵇ, lying in the axis of the shaft 2.

3. *The device for collecting the finished screws.*—70 (Figs. 1, 4) denotes the collecting trough, which is attached by means of screws 71 to the feed channel 8. 72 (Figs. 1, 3, 4) is a stripper which is also attached to the channel 8 and which pushes the finished work piece out of the gripping arm 7 when the latter is raised. 73 and 74 (Figs. 1, 18, 20, 21, 23) are stops fixed to the machine frame.

The above described machine works as follows: The work-pieces, viz. the bolts x which are to be provided with a thread are conveyed by means of the arm 27 from the turning receptacle 31 into the feed channel 8, where they glide down the inclined upper part of the two rails 34 and 35. The bolts x are suspended in this part of the channel 8 on their heads. The guide-pieces 37 and 38 prevent the bolts from falling out laterally of this channel 8. At the starting point of the lateral deflection of the channel 8 there is excited a restraining action upon the work pieces, so that the latter are brought into a horizontal position. Owing to the friction produced in the laterally bent part of the channel 8 the horizontal work pieces are continually rotated during their further downward movement in the channel 8 so that it is quite certain that they will also reach the lower end of said channel 8 in a horizontal position. The holder 39 prevents the lowermost work piece from falling out of the channel 8 till it is taken up by the gripping arm 7. If a work piece has to be introduced into the gripping head and a finished work piece to be taken out of the latter, the feed channel 8 is at first turned through a small angle around the vertical axis 22 by the means of the cam disk 23, the bell crank lever 24 and the rod 26, so that it is brought nearer to the gripping arm 7. While the shaft 3 is rotated, the lower end of the lever 15 is brought in contact with the lifting cam 17 of the cam disk 16 and the gripping arm 7 is therefore moved slightly downward, its clamping piece 9ª taking thereby the lowermost bolt out the feed channel 8. The lower end of the lever 15 passes now over the lifting cam 18, which rapidly lifts said lever. This causes a corresponding downward movement of the gripping arm 7. Before the lever 15 reaches the end of the lifting projection 18 the finished work piece in the gripping head is engaged by the clamping member 9 of the arm 7 (Fig. 18) and after the gripping head has been opened owing to a longitudinal displacement of the rod 69 acted upon by the rod 51, the movement of which is controlled by the arm 50, the shaft 48, roll 48ª and cam disk 49ᵇ, the finished work piece is taken out of the gripping head 6 by the arm 7. As soon as the gripping head 6 has been opened the arm 7 is displaced in a horizontal direction toward the left as regards Fig. 20, since the shaft 12 is now acted upon by the spring 13, which pushes the roll 20 into the recess of the cam disk 21. During this movement of the arm 7 the bolt in the clamping piece 9 strikes against the stop 73 (Fig. 20), so that said bolt to be provided with a screw thread is moved toward the right, i. e. toward the gripping head. The lever 15 passes now over the lifting cam 19, so that the arm 7 is moved into its lowermost position. Immediately afterward the shaft 12 with the arm 7 is again moved toward the gripping head 6, the bolt, to be provided with a screw thread and held by the clamping part 9$^a$, strikes against the pin 66$^b$ of the gripping head 6, while the finished work piece in the clamping part 9 strikes against the fixed stop 74, so that it is moved toward the left as regards the arm 7 (Figs. 21, 22, 23). Thereupon said arm 7 is rapidly moved back into its starting position. The bolt taken out of the feed channel 8 by the clamping member 9$^a$ is, however, gripped by the head 6, the jaws of which are closed during this upward movement of the arm 7, the resilient spring of this member easily permitting the unfinished bolt to slip out of the member 9$^a$. This bolt is prevented by the head 6 from moving till the cutting tool has cut the thread.

As soon as a bolt has been taken out of the feed channel 8 by the clamping member 9$^a$ the lever 24 is acted upon by the greatest concentric part of the cam disk 23, so that the feed channel is rotated by said lever 24 and the rod 26 about its vertical axis 22 and it is brought out of the path of the movement of the gripping arm 7, so that the latter may be moved downward for the purpose of bringing the work piece into engagement with the gripping head 6. As soon as the gripping arm 7 is again in its uppermost position, the feed channel 8 and the collecting trough 70 and the stripper 72 connected to said channel 8 are moved back into their normal positions, the fork-line lower end of the stripper 72 pushing the finished screw bolt out of the clamping member of the upwardly moving arm 7 so that the screw bolt falls into the collecting trough 70. The above described working cycle is now repeated for each new work piece.

As already stated, the gripping head 6 is closed, when the rod 69 is moved toward the right as regards Fig. 8, the inclined surface 68 of this rod acting then upon the adjusting screw 67 provided in the rear part of the gripping levers 65, so that the ends of these levers 65 provided with the clamping jaws 66 are moved one toward another, gripping thereby the work piece. A movement of the rod 69 in the opposite direction allows an opening of the gripping head 6, the adjusting screws 67 being then pressed by the spring 67$^a$ toward the lowermost part of the inclined surface 68. This causes an inward movement of the levers 65, so that the clamping jaws 66 are moved away one from another.

The gripping head 6 according to this invention holds the work piece in a secure manner and accurately centers said piece, no accidental movements being imparted to the work piece, when it has to be taken out of the head 6 and any damaging to the thread is also prevented. The adjusting screws 67 permit of an easy and accurate adjustment of the clamping jaws 66 with regard to the work piece.

I claim:

1. In a screw-cutting machine, a gripping head for the work blanks, a carrying member, a feed channel for conveying said blanks to said carrying member, means to move the carrying member to the head, means on the carrier to grip a blank in the head, a stripper for the carrier, and means to move the stripper into the path of the carrier during the movement of the latter toward the channel.

2. In a screw-cutting machine, a feed channel for the work blanks, a carrying member movable into the channel, means to move the latter away from the carrier, a gripping head, means to move the carrier to the head, means to remove the blank from the carrier to the head, and means on the carrier to remove a bolt from the head.

3. In a screw cutting machine, a feed channel for the work blanks, a carrying member movable into the channel, means to move the latter away from the carrier, a gripping head, means to move the carrier to the head, means to remove the blank from the carrier to the head, means on the carrier to remove a bolt from the head, and a stripper mounted in the path of a bolt on the carrier.

4. In a screw-cutting machine, a feed channel for the work blanks, a carrying member movable into the channel, means to move the latter away from the carrier, a gripping head, means to move the carrier to the head, means to remove the blank from the carrier to the head, means on the carrier to remove a bolt from the head, a stripper carried by the feed channel arranged to engage a bolt on the carrier, and a collecting trough carried by the feed channel below the stripper.

5. In a screw-cutting machine, a feed channel for the work blanks, a gripping head for the latter, a blank carrier, a cam provided with three projections successively increasing in height in the direction of rotation of said cam, the latter depressing the carrier into the axis of the head, means to move the carrier horizontally to and from the head, stationary abutments arranged adjacent the heads to position the work-blanks, means on the carrier to grip a blank in the channel, and means on the carrier to grip a bolt in the head.

6. In a screw cutting machine, a feed channel for the work-blanks having a vertical portion and inclined entrance and exit portions to facilitate the movement of the blanks therein, a gripping head for the blanks, a carrier operable to remove the blanks from the feed channel to the head, a clamping member on the carrier to hold a blank, a disk for moving the carrier to the feed channel and to the head and having cams successively increasing in height to accelerate the movement of said carrier, means to swing the feed channel out of the path of the carrier after the latter has received a blank, a second clamping member on the carrier to engage a screw in the head, means to so position a blank in the carrier that it can be seized by the gripping head, a stripper on the feed channel, and means to so position a screw in the carrier that it will be seized by the stripper upon the movement of the carrier from the head.

7. In a screw cutting machine, a guide channel for the work-blanks having a vertical portion and inclined entrance and exit portions, a rotatable gripping head having a plurality of gripping jaws, clamping levers in said jaws rotatable about a center situated in the axis of rotation of the gripping head, means to rotate the levers into and out of engagement with the blanks, means to regulate the extent of movement of said levers, a carrier arranged to bring the blanks from the feed channel to the head, a clamp on the carrier for holding a blank, a disk for moving the carrier to the feed channel and to the head and having cams successively increasing in height to accelerate the movement of the carrier, means to swing the feed channel out of the path of the carrier after the clamp on the latter has engaged a blank, a second clamp on the transport member adapted to engage a screw in the head, means to so position a blank in the carrier that it can be seized by the head, a stripper on the feed channel, and means to so position a screw in the carrier that it will be seized by the stripper upon movement of the carrier from the head.

8. In a screw-cutting machine, a feed-channel for the work blanks inclined at its lower end, a gripping head for said blanks, mounted below the channel, a carrier for said blanks, means to move the carrier from the channel to the head, means to swing the channel into and out of the path of the carrier, and a stripper on the channel to remove screws from the carrier when the latter is moved from the gripper.

9. In a screw-cutting machine, a feed channel for the work table having a vertical portion and inclined inlet and outlet portions for facilitating the movement of the blanks therein, a blank carrier movable into the channel, a gripping member on the carrier to hold a blank, means to swing the channel out of the path of the carrier after the engagement of a blank by said gripping member, a gripping head for the blanks mounted below the carrier, a gripping member on the carrier arranged to grip a screw in said head, and means to position a work blank in the carrier for engagement by said head.

10. In a screw-cutting machine, a feed channel for the work-blanks having a vertical portion and inclined inlet and outlet portions for facilitating the movement of the blanks therein, a blank carrier movable into the channel, a gripping member on the carrier to hold a blank, means to swing the channel out of the path of the carrier after the engagement of a blank by said gripping member, a gripping head for the blanks mounted below the carrier, a gripping member on the carrier arranged to grip a screw in said head, means to position a work blank in the carrier for engagement by said head, a stripper carried by the feed channel, and means to position a screw in the carrier for engagement by the stripper when said carrier moves from the head.

In testimony that I claim the foregoing as my invention, I have signed my name in presence of two subscribing witnesses.

AUGUST NIGGLI.

Witnesses:
EUGENE NOBEL,
RANDALL ATKINSON.